(12) United States Patent
Commaret et al.

(10) Patent No.: US 7,823,387 B2
(45) Date of Patent: Nov. 2, 2010

(54) GAS TURBINE ENGINE DIFFUSER AND COMBUSTION CHAMBER AND GAS TURBINE ENGINE COMPRISING SAME

(75) Inventors: Patrice Andre Commaret, Rubelles (FR); Michel Andre Albert Desaulty, Vert St Denis (FR); Romain Nicolas Lunel, Brie Comte Robert (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 317 days.

(21) Appl. No.: 12/018,585

(22) Filed: Jan. 23, 2008

(65) Prior Publication Data

US 2008/0245053 A1 Oct. 9, 2008

(30) Foreign Application Priority Data

Jan. 23, 2007 (FR) .................... 07 00453

(51) Int. Cl.
*F02C 1/00* (2006.01)
*F02G 3/00* (2006.01)
(52) U.S. Cl. .............. 60/752; 60/751; 60/755; 60/756; 60/757; 60/796; 60/800
(58) Field of Classification Search ........... 60/252–257, 60/752–757, 751, 796, 800

See application file for complete search history.

(56) References Cited

U.S. PATENT DOCUMENTS 4,380,895 A 4/1983 Adkins
6,895,761 B2 * 5/2005 Mitchell et al. ............... 60/796

FOREIGN PATENT DOCUMENTS

EP 1 717 516 A1 11/2006
WO WO 2005/036057 A1 4/2005

OTHER PUBLICATIONS

U.S. Appl. No. 12/190,105, filed Aug. 12, 2008, Commaret, et al.
J. W. Sanborn, et al., "Advances Turbofan Engine Combustion System Design and Test Verification", Journal of Propulsion and Power, XP 000068028, vol. 5, No. 4, Jul. 1, 1989, pp. 502-509.

* cited by examiner

*Primary Examiner*—Michael Cuff
*Assistant Examiner*—Craig Kim
(74) *Attorney, Agent, or Firm*—Oblon, Spivak, McClelland, Maier & Neustadt, L.L.P.

(57) ABSTRACT

A gas turbine engine diffuser defined between an external casing and an internal casing of the engine and supplied with air via an upstream annular diffuser duct is disclosed. The diffuser includes a combustion chamber of the convergent type, forming an external annular duct with the external casing and an internal annular duct with the internal casing, and a cowling partially closing off the external annular duct. The cowling is positioned toward the closed end of the combustion chamber.

17 Claims, 3 Drawing Sheets

GAS TURBINE ENGINE DIFFUSER AND COMBUSTION CHAMBER AND GAS TURBINE ENGINE COMPRISING SAME

BACKGROUND OF THE INVENTION AND DESCRIPTION OF THE PRIOR ART

The present invention relates to the technical field of combustion chambers for gas turbine engines such as turbojet engines. It is aimed in particular at a diffuser comprising a cowling on the combustion chamber.

In everything which follows, the terms "axial", "radial" and "transverse" correspond respectively to an axial direction, a radial direction, and a transverse plane of the turbojet engine and the terms "upstream" and "downstream" correspond respectively to the direction in which the gases flow through the turbojet engine.

A conventional combustion chamber known as a divergent combustion chamber is illustrated in FIG. 10 which is an axial cross section showing half of the combustion chamber, the other half thereof being symmetric therewith respect to the axis (not depicted) of the engine. The combustion chamber 110 is contained in a diffuser 130 which is an annular space defined between an external casing 132 and an internal casing 134, into which a compressed oxidant originating upstream from a compressor (not depicted) is introduced via an annular diffuser duct 136.

This conventional combustion chamber known as a divergent combustion chamber 110 has an external wall 112 and an internal wall 114 which are coaxial and substantially conical, and which widen in the direction from upstream to downstream at a cone angle α1. The external 112 and internal 114 walls of the combustion chamber 110 are connected to one another toward the upstream end of the combustion chamber via a chamber end wall 116.

The chamber end wall 116 is provided with injection systems 118 through which injectors 120 which introduce fuel into the combustion chamber 110 in which combustion reactions occur pass.

These combustion reactions are intended to cause heat to radiate from the downstream to upstream direction toward the chamber end wall 116. In order to prevent damage to this chamber end wall 116 as a result of the heat, heat shields also known as deflectors 122 are provided, these being positioned on an interior face of the chamber end wall 116. They are cooled using jets of cooling air which enter the combustion chamber 110 through cooling orifices 124 pierced in the chamber end wall 116. These air jets, which flow in the direction from upstream to downstream, are guided by a chamber cowling 126, pass through the chamber end wall 116 through the cooling orifices 124 and impinge on an upstream face of the deflectors 122. The cowling 126 is also used to guide the air supplied to the injection systems 118. It has a substantially semi-toric shape and extends between two concentric edges for attachment to the edges of the chamber wall 116. A central portion of the cowling 126 is open to allow the fuel injection pipes to run as far as the injectors 120. The openings may be a substantially circular single slot. In this case, the cowling 126 is made up of two flanks known as fairings. As an alternative, the openings may consist of a collection of apertures each leading to a group of injectors.

In more recent designs of combustion chamber known as convergent combustion chambers, the external and internal walls of the combustion chamber are inclined such that they widen in the direction from downstream to upstream rather than from upstream to downstream as was the case in the "divergent" conventional combustion chambers described hereinabove.

A "convergent" combustion chamber 10 such as this is illustrated in part in FIG. 11, in axial section. This FIG. 10 shows an axial direction 100 parallel to the axis of the turbojet engine, a generatrix direction 200 of the combustion chamber 10, and a cone angle α2 between these two axes 100, 200. The combustion chamber 10 comprises an external wall 12 and an internal wall 14 which are coaxial and substantially frustoconical, and which widen in the direction from downstream to upstream at a cone angle α2.

The external 12 and internal 14 walls of the combustion chamber 10 are connected to one another toward the upstream end of the combustion chamber by a chamber end wall 16 which is a substantially frustoconical part running between two substantially transverse planes and widening in the direction from upstream to downstream. The chamber end wall 16 is connected to each of the two, external 12 and internal 14, walls of the combustion chamber 10. It is provided with injection systems 18 through which injectors 20 pass these passing through the outer casing 32 and introducing fuel into the combustion chamber 10 where the combustion reactions take place.

The combustion chamber 10 is contained in a diffuser 30 which is an annular space defined between an external casing 32 and an internal casing 34 and into which a compressed oxidant originating upstream from a centrifugal compressor (not depicted) is introduced via an annular diffuser duct 36. The oxidant is generally air. The combustion chamber 10 is positioned right into the diffuser 30 between an external part 28 and an internal part 29 of this diffuser 30. The external part 28 of the diffuser 30 constitutes an annular and conical space contained between the external casing 32 and the external wall 12 of the combustion chamber 10. The internal part 29 of the diffuser 30 constitutes an annular and conical shape contained between the internal casing 34 and the internal wall 14 of the combustion chamber 10.

Some of the oxidant, generally air, enters the diffuser 30 followed by the combustion chamber 10 to participate in the combustion reactions taking place therein. The entry of oxidant to the combustion chamber 10 is guided by the cowling 226. Some more of the oxidant flows into the diffuser 30, bypassing the combustion chamber 10, on the one hand through an external part 28 of the diffuser 30 which is contained between the external casing 32 and the external wall 12 of the combustion chamber and, on the other hand, through an internal part 29 of the diffuser 30 which is contained between the internal casing 14 and the internal wall 34 of the combustion chamber.

With a configuration such as this, an imbalance arising between the bypass flow bypassing the combustion chamber 10 around the outside, in the external part 28 of the diffuser 30, and the bypass flow bypassing this same combustion chamber 10 on the inside, through the internal part 29 of the diffuser 30. It then follows that the pressure drops available across the external wall 12, and which correspond to the difference in pressure between the external part 28 of the diffuser 30 and the inside of the combustion chamber 10 exceed the pressure drops available across the internal wall 14, which correspond to the difference in pressure between the internal part 29 of the diffuser 30 and the inside of the combustion chamber 10.

This imbalance in the pressure drops between the external wall 12 and the internal wall 14 is detrimental to the correct operation of the combustion chamber 10 because the primary jets enter and are diluted better in the region of the external wall 12 than in the region of the internal wall 14. Furthermore, because the pressure drops available are lower across the internal wall 14, this wall is more difficult to cool.

What is more, the pressure drops available for supplying air to the injection systems 18 is reduced because the diffuser duct 36 does not lie directly facing the injection systems 18.

SUMMARY OF THE INVENTION

The invention proposes to remedy these disadvantages and proposes a design which appreciably reduces this imbalance.

In a first aspect, the invention relates to a gas turbine engine diffuser defined between an external casing and an internal casing of said engine and supplied with air via an upstream annular diffuser duct, comprising a combustion chamber of the convergent type, forming an external annular duct with the external casing and an internal annular duct with the internal casing, which diffuser comprises a cowling partially closing off the external annular duct. More specifically, the cowling is positioned toward the closed end of the combustion chamber.

The cowling preferably comprises a body substantially in the form of a part exhibiting symmetry of revolution about a cowling axis, said body extending between two planes which are substantially transverse with respect to said cowling axis.

According to one embodiment, said two planes coincide and said body is an annular portion of a disk.

According to another embodiment, said two planes are distinct from one another and said body is frustoconical.

As a preference, said body has a substantially flat cross section and has a radially external and a radially internal end, and said cowling comprises an external edge extending from said radially external end and an internal edge extending from said radially internal end.

Furthermore, the cowling has at least one aperture formed in said body. As a preference, said aperture is an aperture with turned-down edges.

The cowling further comprises fixing means for fixing it to the combustion chamber. As a preference, said fixing means are positioned on said internal edge.

In a second aspect, the invention relates to a combustion chamber positioned in a diffuser according to the first aspect.

When the combustion chamber is of the type comprising an external wall, an internal wall and a chamber end wall connecting the aforesaid two walls, the cowling is fixed to the chamber end wall. In particular, the cowling is fixed to the combustion chamber toward the connection between the chamber end wall and said external wall. To fix the cowling to the chamber end wall when the cowling is of the type comprising an internal edge extending from a radially internal end of the body of the cowling, said internal edge is fixed to an upstream face of the chamber end wall.

In a third aspect, the invention relates to a gas turbine engine such as a turbojet engine which comprises a diffuser according to the first aspect with a combustion chamber according to the second aspect. When the gas turbine engine is of the type comprising a combustion chamber and an external casing and an internal casing between which casings said combustion chamber lies, it preferably comprises a cowling having an external edge which rests against said external casing. In particular, said cowling resting on said external casing allows there to be some axial clearance between these two parts.

BRIEF DESCRIPTION OF THE DRAWINGS

The invention will be better understood from reading the detailed description which follows, of some particular embodiments of the invention, which are given by way of entirely nonlimiting indication and illustrated by means of the attached drawings, in which.

DESCRIPTION OF THE PREFERRED EMBODIMENTS

Figure 1:
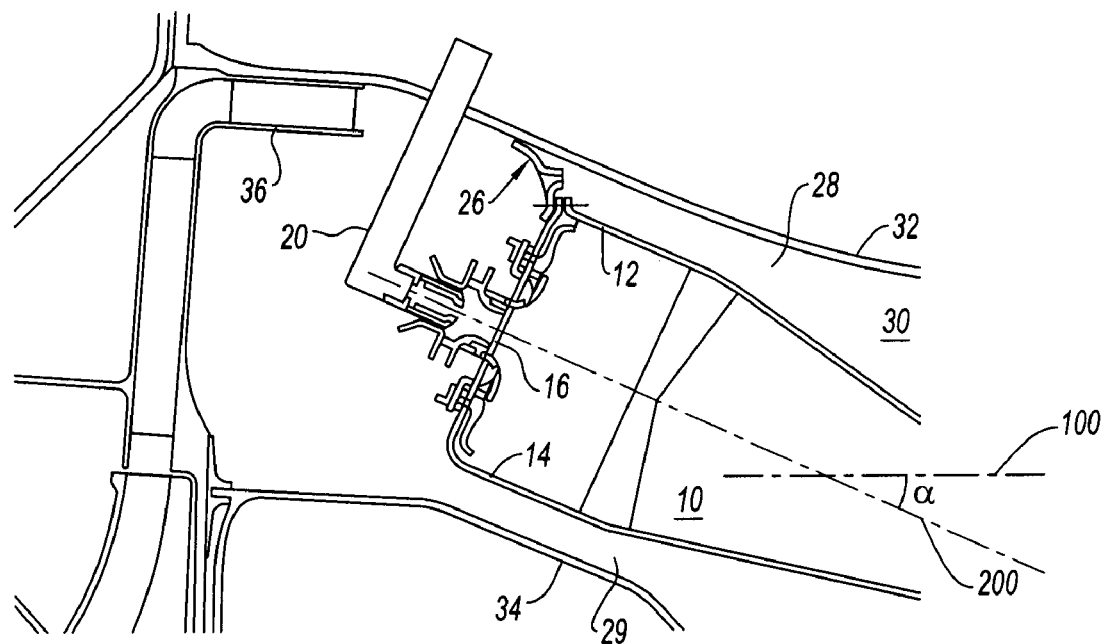
FIG. 1 is a view in axial section of part of a gas turbine engine having a combustion chamber of the convergent type, showing half of the combustion chamber and showing half of a cowling according to the invention, the other half being axially symmetric therewith.

Reference is made first of all to FIG. 1 which, in axial section, depicts half of a combustion chamber of the convergent type. This combustion chamber 10 is substantially similar to that of the prior art illustrated in FIG. 11 and comprises an external wall 12 and an internal wall 14 which are coaxial and substantially frustoconical and which widen in the direction from downstream to upstream at a cone angle $\alpha 2$.

The combustion chamber 10 is contained in a diffuser 30 which is an annular space defined between an external casing 32 and an internal casing 34 into which an annular diffuser duct 36 opens. The diffuser 30 comprises an external part 28 delimited between the external casing 32 and the external wall 12 of the combustion chamber and an internal part 29 delimited between the internal casing 34 and the internal wall 14 of the combustion chamber 10.

Figure 11:
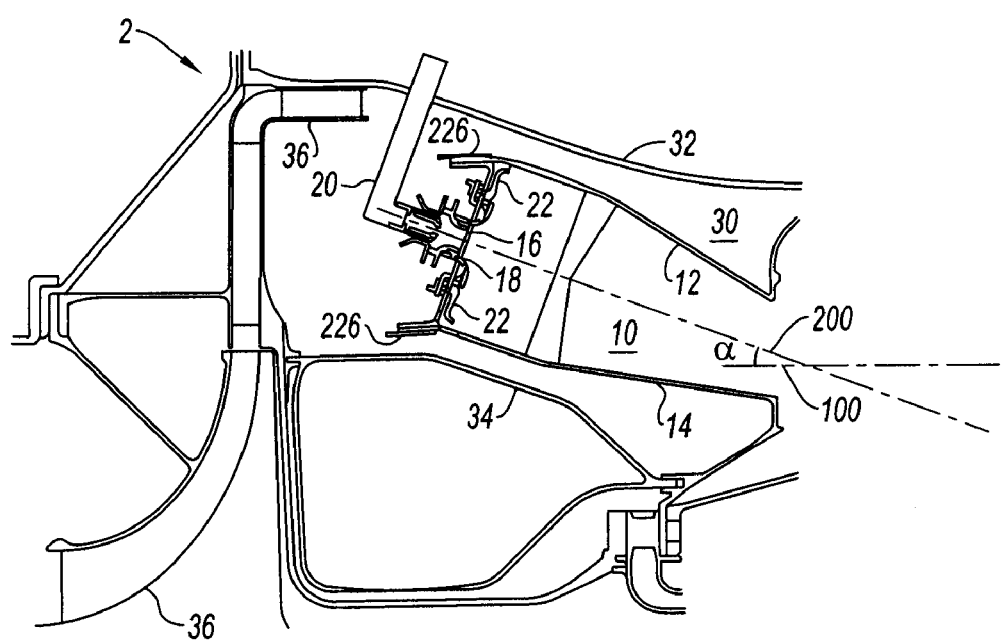
FIG. 11, which has already been described, is a view in axial section of a convergent combustion chamber provided with another cowling of the prior art.
Figure 2:
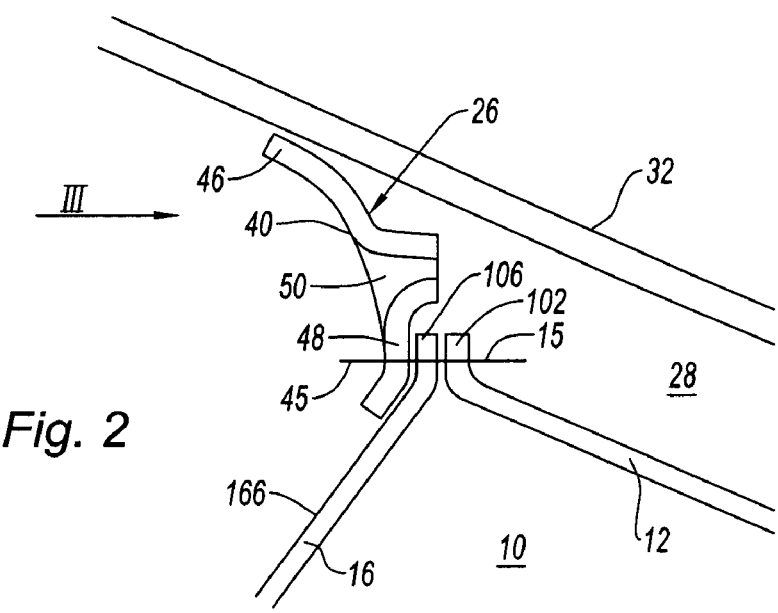
FIG. 2 is a view on a larger scale of a detail of FIG. 1, showing a first embodiment of the cowling according to the invention.

The external 12 and internal 14 walls are connected, toward the upstream end of the combustion chamber, via a chamber end wall 16 substantially similar to that of FIG. 11 and provided with injection systems 18 through which injectors 20 which pass through the outer casing 32 pass.

This combustion chamber 10 according to the invention differs from that of the prior art illustrated in FIG. 11 through its cowling 26 and the connection between this cowling 26 and the chamber end wall 16.

As illustrated in FIGS. 1, 2, 8 and 9, the cowling 26 according to the invention is an annular part exhibiting symmetry of revolution about a cowling axis 260 and which is positioned between the external casing 32 and the combustion chamber 10 in such a way that it closes off the external part 28 of the diffuser 30. It has a cowling body 40 with a substantially flat cross section and a radially external end 42 and a radially internal end 44. The cowling 26 is provided with an external edge 46 extending from the radially external end 42 and with an internal edge 48 extending from the radially internal end 44.

Figure 8:
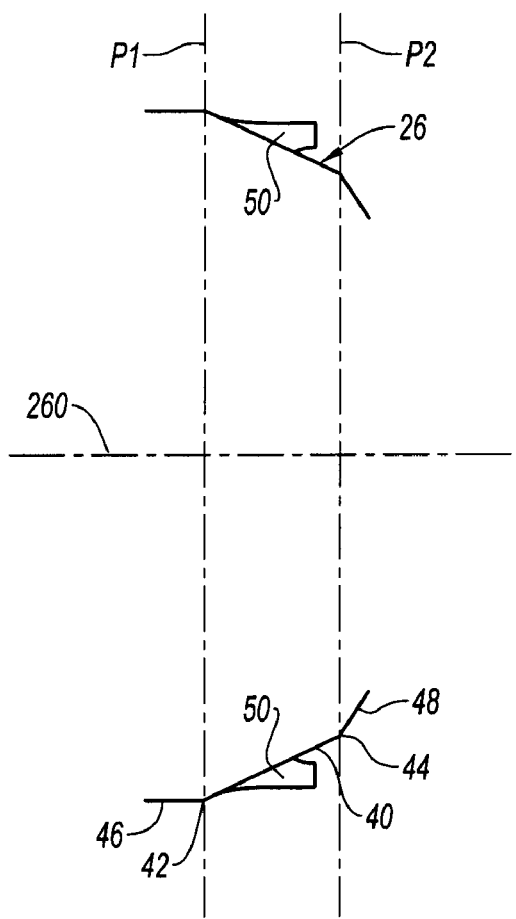
FIG. 8 is a schematic view of a cowling according to a first embodiment, in section on its axis.

According to the first embodiment illustrated more specifically in FIG. 8, the body 40 is in the form of a cone frustum lying between two planes P1 and P2 which are transverse with respect to the cowling axis 260. When the cowling 26 is in place in the diffuser 30, the external edge 46 of the cowling 26 extends substantially toward the upstream end of the diffuser 30, and its internal edge 48 extends substantially toward the cowling axis 260 which then coincides with the axis of the turbojet engine 100.

Figure 9:
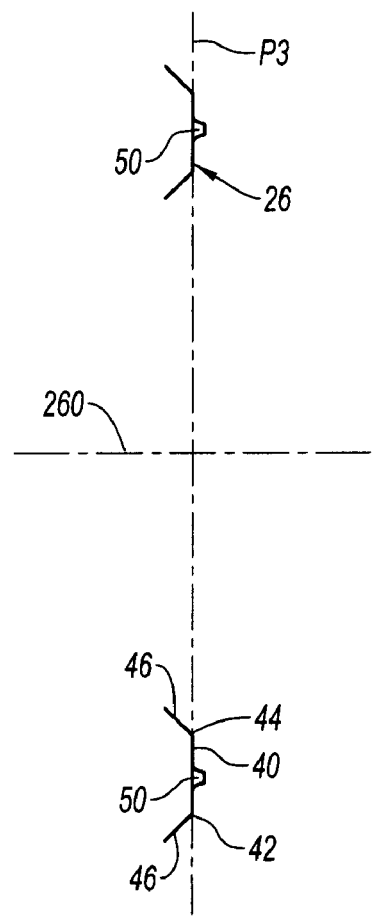
FIG. 9 is a view similar to FIG. 8 for a second embodiment of the cowling.

According to the second embodiment illustrated more specifically in FIG. 9, the body 40 is in the form of a portion of a disk contained in a plane P3 that is transverse with respect to the cowling axis 260. When the cowling 26 is in place in the diffuser 30, the external edge 46 and the internal edge 48 of the cowling 26 extend substantially toward the upstream end of the diffuser 30. In addition, when the cowling 26 is in use, the cowling axis 260 and the axis 100 of the turbojet engine coincide.

According to the first or second embodiments of the cowling 26, this cowling is fixed to the combustion chamber 10.

As illustrated in FIG. 1, the chamber end wall 16 and the external wall 12 are fixed to one another in an airtight manner. In the example illustrated in FIGS. 1 and 2, this fixing is performed using a screwed or bolted connection 15 between a flange 102 of the external wall 12 and a flange 106 of the chamber end wall 16, these two flanges extending radially outward. These flanges may be annular about the axis of the turbojet engine 110 (see FIGS. 1 and 2) or frustoconical about this same axis.

As a preference, the cowling 26 is fixed to the combustion chamber 10 via fixing means positioned on its internal edge 48. In the example illustrated in FIGS. 1 and 2, these fixing means comprise holes (not visible in the figures) and screws and/or bolts 45 passing through these holes and fixing onto a wall of the combustion chamber. As a preference, the cowling 26 is fixed to an upstream face 166 of the chamber end wall 16. In the example illustrated, said screws and/or bolts 45 coincide with the screwed or bolted connection 15 already described, fixing being performed where the external wall 12 of the combustion chamber 10 meets the chamber end wall 16. The holes and the screws and/or bolts 45 are, for example, distributed over the periphery of the internal edge 48 of the cowling 26. Likewise, the fixing flanges 102 and 106 are provided with fixing holes uniformly distributed about their periphery.

According to the invention, the external edge 46 of the cowling 26 is not fixed, but simply rests against an interior face of the external casing 32 delimiting the diffuser 30. A non-fixed connection such as this has the advantage of allowing relative slippage of the cowling 26 with respect to said external casing 32 in a direction substantially parallel to the axis 100 of the turbojet engine. Because of the orientation of this external edge 46 with respect to the body 40 of the cowling 26 (see FIG. 2), the connection between said cowling 26 and said external casing 32 is an airtight or almost airtight connection, give or take the translational clearance.

Figure 3:
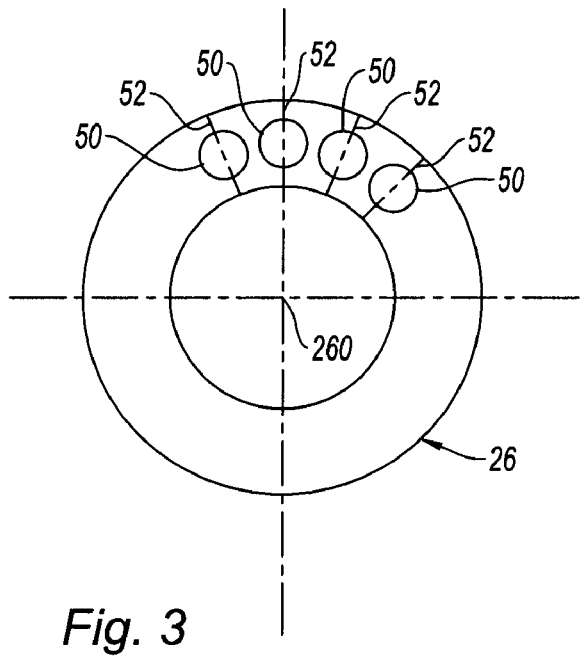
FIG. 3 depicts a cowling according to the invention, viewed from upstream in the direction of arrow III in FIG. 2, and showing apertures in the cowling according to the invention.

As illustrated in FIG. 3 which is a view from the upstream end of the body 40 of the cowling 26, the cowling 26 according to the first embodiment or the second embodiment is preferably provided with at least one aperture 50 passing through said body 40. This then means that the external part 28 of the diffuser 30 is not closed off by said cowling 26 in an entirely airtight fashion but, on the other hand, allows some oxidant, which is air, to pass through.

In practice, the cowling 26 comprises a plurality of apertures 50 which are positioned on its body 40 and circumferentially distributed thereon. For example, there are the same number of apertures 50 as there are injection systems passing through the chamber end wall 16 and the apertures lie on extensions of the corresponding injection axes 52. According to one particular embodiment, said apertures 50 are apertures 50 with turned-down edges, the edge of each aperture 50 extending in the downstream direction of the turbojet engine 2 when the cowling 26 is installed in said turbojet engine 2. Apertures with turned-down edges guide the flow better than apertures that do not have turned-down edges.

Figure 4:
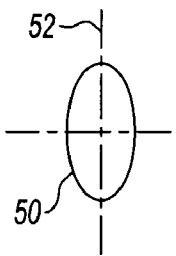
FIGS. 4 to 7 schematically depict other shapes of aperture according to the invention.
Figure 5:
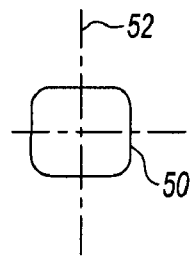
Figure 6:
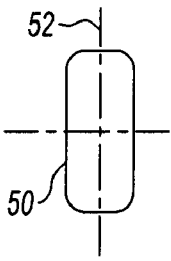
Figure 7:
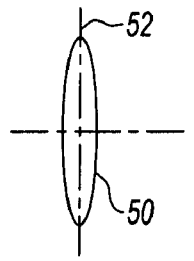
Figure 10:
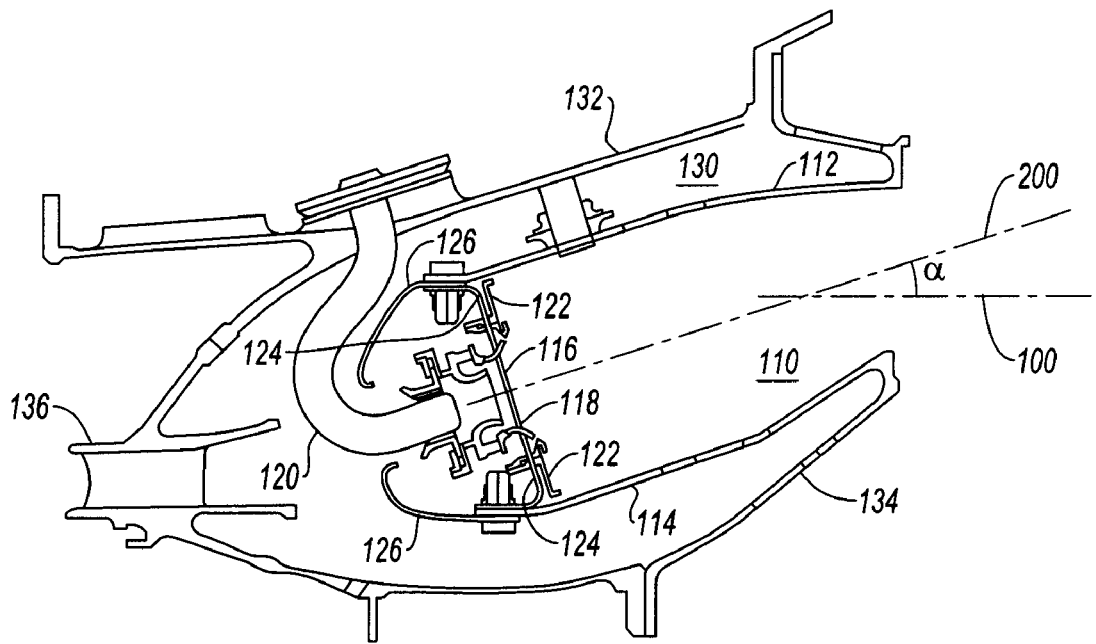
FIG. 10, which has already been described, is a view in axial section of a divergent combustion chamber of the prior art, provided with a cowling of the prior art.

The shapes and sizes of the apertures 50 are determined according to the amount of oxidant that is to be allowed to pass through said apertures 50. To simplify the process of manufacturing a cowling 26 such as this, the apertures 50 may be chosen to be identical to one another on one and the same cowling 26 body 40. In the example illustrated in FIG. 3, said apertures 50 are substantially circular. According to other embodiments, said apertures are substantially oval or elliptical (FIG. 4) or substantially square (FIG. 5) or substantially rectangular (FIG. 6) or may even be in the form of a slot (FIG. 7). Of course, other shapes may also be chosen.

Thus, the presence of the apertures 50, their shape(s) and their sizes allow the relative pressure drops to be tailored to suit the flow of bypass air bypassing the combustion chamber 10 and passing via the external part 28 of the diffuser. It is thus possible to balance the pressure drops of this external bypass air flow with the pressure drops of the internal bypass flow passing through the internal part 29 of the diffuser and supplied to the injection systems 18 and the internal wall 14 of the combustion chamber 10.

One advantage of the invention lies in the fact that the internal bypass air flow bypassing the combustion chamber 10 is improved by the shape of the cowling 26. This is because the internal bypass air is guided toward the injection systems 18 and toward the internal part 29 of the diffuser 30 by the web situated between the apertures 50 in the cowling 26.

The invention claimed is:

1. A gas turbine engine diffuser defined between an external casing and an internal casing of said engine and supplied with air via an upstream annular diffuser duct, the diffuser comprising:
    a combustion chamber of the convergent type, defining an external annular duct with the external casing and an internal annular duct with the internal casing; and
    a cowling disposed between the external casing and the combustion chamber so as to partially close off the external annular duct,
    wherein the cowling includes a body with a symmetry of revolution about a cowling axis, the body includes a substantially flat cross section with a radially external end and a radially internal end, a radially external edge which extends from the radially external end and a radially internal edge which extends from the radially internal end, and
    wherein the radially external edge of the cowling rests against an internal face of the external casing.

2. The diffuser as claimed in claim 1, wherein the cowling is positioned toward a closed end of the combustion chamber.

3. The diffuser as claimed in claim 1, wherein the body of the cowling extends between two planes which are substantially transverse with respect to the cowling axis.

4. The diffuser as claimed in claim 3, wherein the two planes coincide and the body is an annular portion of a disk.

5. The diffuser as claimed in claim 3, wherein the two planes are distinct from one another and the body is frustoconical, widening in the direction from downstream to upstream.

6. The diffuser as claimed in claim 1, wherein the cowling includes at least one aperture disposed in the body of the cowling.

7. The diffuser as claimed in claim 6, wherein the aperture includes turned down edges.

8. The diffuser as claimed in claim 1, wherein the cowling further comprises fixing means for fixing the cowling to the combustion chamber.

9. The diffuser as claimed in claim 8, wherein said fixing means are positioned on the radially internal edge of the cowling.

10. A combustion chamber positioned in a diffuser as claimed in claim 1, the combustion chamber comprising:
an external wall;
an internal wall; and
a chamber end wall connecting the external wall and the internal wall,
wherein the cowling is fixed to the chamber end wall.

11. The combustion chamber as claimed in claim 10, wherein the cowling is fixed to the combustion chamber toward the connection between the chamber end wall and the external wall.

12. The combustion chamber as claimed in claim 10, wherein the radially internal edge of the cowling is fixed to an upstream face of the chamber end wall.

13. A gas turbine engine comprising a diffuser as claimed in claim 1.

14. The gas turbine engine as claimed in claim 13 comprising a combustion chamber including:
an external wall;
an internal wall; and
a chamber end wall connecting the external wall and internal wall,
wherein the cowling is fixed to the chamber end wall.

15. The gas turbine engine as claimed in claim 14, wherein the combustion chamber is disposed between the external casing and the internal casing.

16. The gas turbine engine as claimed in claim 15, wherein the cowling is disposed to allow an axial clearance between the cowling and the external casing.

17. The diffuser as claimed in claim 9, wherein the fixing means are positioned on a flange of an external wall of the combustion chamber and a flange of an end wall of the combustion chamber.

* * * * *